United States Patent [19]

Dietz et al.

[11] 4,194,075

[45] Mar. 18, 1980

[54] MAGNESIUM REDUCING AGENT-HYDROCARBYLALUMINUM HALIDE COCATALYST FOR TITANIUM TETRAHALIDE

[75] Inventors: Richard E. Dietz; Charles M. Selman, both of Bartlesville, Okla.

[73] Assignee: Phillips Petroleum Company, Bartlesville, Okla.

[21] Appl. No.: 902,123

[22] Filed: May 2, 1978

Related U.S. Application Data

[63] Continuation-in-part of Ser. No. 686,606, May 14, 1976, abandoned.

[51] Int. Cl.² ............................ C08F 4/02; C08F 10/02
[52] U.S. Cl. ................................ 526/125; 252/429 B; 252/429 C; 526/151; 526/352
[58] Field of Search .................... 252/429 C; 526/125, 526/144, 151

[56] References Cited

FOREIGN PATENT DOCUMENTS

| | | | |
|---|---|---|---|
| 2230672 | 12/1972 | Fed. Rep. of Germany | 526/175 |
| 2517567 | 10/1975 | Fed. Rep. of Germany | 526/151 |
| 1128724 | 10/1968 | United Kingdom | 526/142 |
| 1235062 | 6/1971 | United Kingdom | 526/151 |
| 1251177 | 10/1971 | United Kingdom | 526/151 |
| 1299862 | 12/1972 | United Kingdom | 526/151 |
| 1373981 | 11/1974 | United Kingdom | 526/151 |
| 1373982 | 11/1974 | United Kingdom | 526/151 |
| 1391322 | 4/1975 | United Kingdom | 526/151 |

*Primary Examiner*—Edward J. Smith

[57] ABSTRACT

A magnesium reducing agent is prepared by reacting an organic halide with magnesium metal in the absence of an ether or other complexing diluent, preferably in the absence of any extraneous diluent, to form a magnesium reducing agent which is thereafter mixed with an organoaluminum halide to form a cocatalyst. The resulting cocatalyst is contacted with a titanium tetrahalide to give a catalyst. This catalyst is suitable for olefin polymerization and particularly suitable for the polymerization of ethylene. In one embodiment, the organic halide is added dropwise to the magnesium metal.

15 Claims, No Drawings

MAGNESIUM REDUCING AGENT-HYDROCARBYLALUMINUM HALIDE COCATALYST FOR TITANIUM TETRAHALIDE

CROSS REFERENCE TO RELATED APPLICATIONS

This is a continuation-in-part of copending application Ser. No. 686,606, filed May 14, 1976, now abandoned.

BACKGROUND OF THE INVENTION

This invention relates to magnesium reduced titanium tetrahalide catalyst systems.

It is known to utilize true Grignard reagents of the formula RMgX prepared in the presence of an ether to reduce titanium tetrahalide in the production of catalysts. It is also known to produce what is termed in the art a "solventless" Grignard, which is produced by reacting magnesium metal with an organic halide in the presence of a solvent which is designated as a nonsolvating solvent (i.e., an inert noncomplexing diluent) such as a hydrocarbon as distinguished from an ether. The use of true Grignard reagents, i.e., solutions of organomagnesium halide in ether presents serious difficulties, however, in the production of certain catalysts, particularly in the production of olefin polymerization catalysts, in view of the fact that the large amount of ether is difficult to remove and the remaining complexed ether can reduce the effectiveness of olefin polymerization catalyst systems prepared with the thus-treated Grignard reagent.

Because of greater process economics, it is desirable to carry out olefin polymerization reactions, particularly polymerization reactions involving ethylene and predominantly ethylene copolymers, in an inert diluent at a temperature at which the resulting polymer does not go into solution, with the polymer being recovered without elaborate steps to remove the catalyst. In order for this more economical method of manufacture to be feasible from a practical standpoint, the catalyst must be capable of producing polymer in high productivities in order to maintain the residual catalyst level in the final product at a very low level.

Unfortunately, many catalyst preparation techniques which are capable of producing satisfactory catalysts involve difficult and expensive procedures which cancel out part of the benefits obtained from utilizing these catalysts so far as the economics of the process are concerned.

SUMMARY OF THE INVENTION

It is an object of this invention to provide a magnesium reducing agent prepared in the absence of an ether;

It is a further object of this invention to provide a magnesium reducing agent prepared in the absence of any extraneous diluent;

It is yet a further object of this invention to provide a catalyst system capable of giving high productivity;

It is yet a further object of this invention to provide a simplified method of producing highly active catalyst systems; and It is yet a further object of this invention to provide an improved catalyst for the polymerization of olefins such as ethylene without the necessity for elaborate catalyst removal procedures from polymers thus produced.

In accordance with this invention an organic halide is reacted with magnesium metal in the absence of any complexing diluent to produce a magnesium reducing agent which is mixed with a dihydrocarbylaluminum halide to produce a cocatalyst which is thereafter contacted with a titanium tetrahalide.

DESCRIPTION OF THE PREFERRED EMBODIMENTS

The organic halide is a saturated or unsaturated hydrocarbyl halide of formula RX in which X represents a halogen atom, preferably chlorine or bromine, and R is selected from an alkynyl, alkenyl, alkyl, aryl, cycloalkenyl and cycloalkyl radical and combinations thereof such as aralkyl and the like containing from 1 to about 12 carbon atoms per molecule. The organic halide can also be a polyhalogenated hydrocarbyl halide of formula $R'X_2$ where X represents a halogen atom as before and R' is a saturated divalent hydrocarbyl radical, containing from 2 to about 10 carbon atoms per molecule. Exemplary organic halides include methyl chloride, n-butyl bromide, n-pentyl chloride, n-dodecyl chloride, 1,2-dibromoethane, 1,4-dichlorobutane, 1,10-dibromodecane, cyclohexyl chloride, bromobenzene, and the like. A primary alkyl halide such as n-pentyl chloride is a presently preferred compound.

The magnesium is in the form of the free metal, preferably in the form of a powder.

The reaction between the organic halide and the magnesium metal to form the magnesium reducing agent can be carried out in any suitable manner. Laboratory experiments have demonstrated, however, that care must be exercised if all of the halide and magnesium are combined essentially simultaneously since the reaction gives off a great deal of heat. Therefore, it is recommended that the halide be added slowly to the magnesium or the magnesium added slowly to the halide or that relatively small amounts of halide and magnesium for the size of the reactor be used, or that some form of cooling be employed, such as the use of a diluent which is nonreactive in the conditions of the reactor to absorb and carry away heat.

Preferably, the organic halide is added slowly to the magnesium, preferably while the magnesium is being stirred, preferably over a time of 1 to 10 hours. One way to accomplish this is to add the halide dropwise. It is preferred that this be done in the absence of any extraneous diluent, the only liquid being present being unreacted organic halide. The temperature is preferably the reflux temperature for the organic halide although a higher or lower temperature can be used by using pressure or cooling. Reflux temperature for pentyl chloride is 108° C. Temperatures of 80°–110° C. are particularly suitable. It is also possible to utilize an inert diluent such as a nonreactive hydrocarbon in which case the magnesium powder is dispersed in the inert diluent. Suitable hydrocarbons include pentane, hexane, cyclohexane, heptane, and other hydrocarbons of the type known in the art for use as diluents or solvents in olefin polymerization.

Other methods of reacting the halide with the magnesium metal, include shaving magnesium metal from a large bar or the like into the organic halide, or milling the halide and magnesium metal. Particularly in this last embodiment, the presence of a noncomplexing diluent to carry away heat may be preferred. The milling, for instance, with a conventional roll mill or conventional ball or rod mill maintains the proper surface while the noncomplexing diluent carries away heat. A vibratory ball mill can also be used, such mills being commercially available under the designation Vibratom available from Angstrom, Inc. P.O. Box 248 Bellville, Michigan 48111. In either event, ether and other polar complexing diluents are avoided. The term "in the absence of any extraneous diluent" (i.e., added diluent) as used throughout this specification and claims is meant to exclude the introduction of any complexing solvent or any noncomplexing or inert diluent such as a hydrocarbon. Of course, the organic halide itself is a liquid. Also, after the reaction is essentially complete an inert diluent or solvent may be added to facilitate handling. Ether is avoided, as noted hereinbelow, because it is difficult to remove large amounts of remaining ether and because of the remaining complexed ether which can reduce the activity of the catalyst system. In addition, the presence of the ether results in the formation of a substantially different product.

A typical analysis of the magnesium reducing agent of this invention using n-pentyl chloride is:

| Compound | Weight Percent |
| --- | --- |
| Hydrocarbon Soluble Components | |
| Di-n-pentylmagnesium | 25.0 |
| Decane | 8.2 |
| Di-n-decylmagnesium | 1.1 |
| Magnesium n-pentoxide | 0.6 |
| Hydrocarbon Insoluble Components | |
| Magnesium chloride | 55.2 |
| Magnesium | 4.9 |
| Chloromagnesium hydride | 2.3 |
| n-Pentylmagnesium chloride | 2.0 |
| Magnesium n-pentoxide | 0.7 |

This is shown for illustrative purposes and is not intended to limit the scope of the invention to the dropwise addition of n-pentyl chloride in the absence of any diluent as used for this analysis. Substantial variation in the exact analysis from that shown is obtained if a different halogen is used or if a different organo radical is substituted for the n-pentyl. However, in all cases, whatever method is used to react the halide and the magnesium, there is present in accordance with the invention a substantial amount (at least 10 weight percent) each of the diorganomagnesium compound and the magnesium halide. It is the reaction mixture that is the magnesium reducing agent as defined herein, i.e., including both hydrocarbon soluble and hydrocarbon insoluble components.

The organoaluminum compound must be a dihydrocarbylaluminum halide of the formula $R''_2AlX$ wherein X is a halogen atom, preferably chlorine or bromine and wherein each $R''$ is the same or a different radical selected from alkyl and aryl radicals having 1 to about 12 carbon atoms per molecule. Exemplary compounds include dimethylaluminum bromide, diethylaluminum chloride, diisobutylaluminum chloride, diphenylaluminum chloride, ethylphenylaluminum chloride, di-n-dodecylaluminum bromide and the like. A presently preferred compound is diethylaluminum chloride (DEAC).

The magnesium reducing agent and organoaluminum compound are then simply mixed together without the necessity for milling or other intensive mixing conditions to form the cocatalyst. This can be done simply by mixing the two in the vessel either alone or in the presence of an inert hydrocarbon as described hereinabove or by simply adding the magnesium reducing agent and organoaluminum halide as separate streams to a reactor. It is essential that there be no contact between the titanium tetrahalide and either component of the cocatalyst prior to the time the cocatalyst is formed by mixing the magnesium reducing agent and the organoaluminum halide. That is, titanium tetrahalide must not contact the organoaluminum halide alone and must not contact the magnesium reducing agent alone but rather the magnesium reducing agent and organoaluminum compound must be mixed together prior to contact with the titanium tetrahalide.

The titanium tetrahalide is either titanium tetrachloride, titanium tetrabromide, or titanium tetraiodide, preferably titanium tetrachloride.

It is within the scope of this invention to employ one or more adjuvants, these being polar organic compounds, i.e., Lewis bases (electron donor compounds) with the titanium tetrahalide component or the cocatalyst component or both. Alternatively, or in addition, the adjuvant can be present with the organoaluminum halide component before contact with the magnesium reducing agent to form the cocatalyst. Also, the adjuvant can be added at the same time the cocatalyst and titanium tetrahalide are first contacted. Suitable adjuvants are described in U.S. Pat. No. 3,642,746 the disclosure of which is incorporated by reference. They include alcoholates, aldehydes, amides, amines, arsines, esters, ethers, ketones, nitriles, phosphines, phosphites, phosphoramides, sulfones, sulfoxides, and stibines. Exemplary compounds include sodium ethoxide, benzaldehyde, acetamide, triethylamine, trioctyl arsine, ethyl acetate, diethyl ether, acetone, benzonitriles, triphenyl phosphine, triphenyl phosphite, hexamethyl phosphoric triamide, dimethyl sulfone, dibutyl sulfoxide, triethyl stibine, triethyl amine, triphenyl phosphite and dimethyl analine.

Preferred esters are the lower alkyl esters (i.e., 1 to 4 carbon atoms per molecule) of benzoic acid which may be additionally substituted in the para position to the carboxyl group with a monovalent radical selected from the group consisting of —F, —Cl, —Br, —I, —OH, —OR''', —OOCR''', —SH, —NH, —NR$_2$''', —NHCOR''', —NO$_2$, —CN, —CHO, —COR''', —COOR''', —CONH$_2$, —CONR$_2$''', —SO$_2$R''', and —CF$_3$. The R''' is an alkyl radical having 1–4 carbon atoms. Exemplary compounds include ethyl anisate (ethyl-p-methoxybenzoate), methyl benzoate, ethyl benzoate, ethyl p-dimethylaminobenzoate, ethyl p-fluorobenzoate, ethyl p-trifluoromethylbenzoate, methyl p-hydroxybenzoate, methyl p-acetylbenzoate, methyl p-nitrobenzoate, ethyl p-mercaptobenzoate and mixtures thereof. Particularly preferred compounds are ethyl anisate and ethyl benzoate.

Generally, when polymerizing ethylene, which is the preferred utility for the catalysts of this invention, no adjuvant is used, although as can be seen from Example II hereinbelow an adjuvant can be used. Generally, an adjuvant is used in the less preferred embodiments of this invention where the catalyst is used for propylene polymerization.

The molar ratio of dihydrocarbylaluminum halide compound(s) to adjuvant(s) is generally in the range of about 1:1 to about 300:1. The atom ratio of aluminum to magnesium can range from about 0.1:1 to about 4:1, more preferably from about 0.5:1 to about 2:1. The molar ratio of titanium compound to adjuvant(s) is generally in the range of about 1:1 to about 200:1. The atom ratio of aluminum to titanium can range from about 20:1 to about 10,000:1, more preferably from about 200:1 to 3,300:1. It has been found that greatly increased productivity is achieved at a higher Al/Ti gram atom ratio, which increase in productivity begins at about a ratio of 200:1 and levels out at a ratio of about 3,300:1. Most preferably the ratio is about 500:1 to 2,400:1.

The mole/gram atom ratio of organic halide to magnesium used to prepare the mangesium reducing agent can vary from 0.25:1 to 1:0.25, but is preferably about stoichiometric (1/1).

The catalyst component of this invention can be used unsupported or supported on a particulate solid carrier, i.e., silica, silica-alumina, magnesia, magnesium carbonate, magnesium chloride, magnesium alkoxides such as magnesium methoxide, and the like. The weight ratio of titanium tetrahalide to carrier can vary from about 0.05:1 to about 1:1, more preferably from about 0.1:1 to about 0.3:1.

The catalysts of this invention are useful in the polymerization of at least one mono-1-olefin having 2 to 8 carbon atoms per molecule and are of particular utility in the polymerization of ethylene and 1-olefin mixtures containing a predominant amount of ethylene. The catalysts are of particular utility in the polymerization of ethylene or the copolymerization of ethylene and minor amounts of propylene, butene-1 or hexene-1 in an inert hydrocarbon diluent at a temperature at which the resulting polymer is insoluble in the diluent.

Broadly, the polymerization conditions employed in this invention are similar to other related processes in which a catalyst system comprising a titanium tetrahalide and an organoaluminum compound are used. In the preferred polymerization of ethylene in a particle form system wherein the resulting polymer does not go into solution, the polymerization temperature generally falls in the range of 0° to 150° C., more preferably about 40° to 112° C. Any convenient partial pressure of ethylene can be used. The partial pressure generally falls within the range of about 10 to 500 psig (69 to 3447 kPa). The concentration of titanium compound per liter of diluent during the polymerization can vary within the range of about 0.005 to 10, more preferably from about 0.001 to 2 milligram atoms titanium per liter of diluent.

The diluent used in the polymerization process is one which is unreactive under the conditions employed. The diluent is preferably a hydrocarbon such as isobutane, n-pentane, n-heptane, cyclohexane and the like.

As is known in the art, control of the molecular weight of the polymer can be obtained by the presence of hydrogen in the reactor during polymerization. Run times can vary from about ½ to 5 hours or longer.

In general, the charge order of the various components to the reactor consists of adding the cocatalyst product, then the titanium compound and finally the diluent. Hydrogen, if used, is then added. The reactor and its contents are heated to the polymerization temperature, ethylene and comonomer, if used, are admitted and the polymerization begins.

It is noted that the product formed in mixing the cocatalyst and the titanium tetrahalide can be used directly to effect polymerization without the addition of an activator, such as triethyl aluminum or other organoaluminum compounds. Thus, subject to the provision that the catalyst can contain adjuvants, the final catalyst can be viewed as consisting essentially of the reaction product of the cocatalyst and the titanium tetrahalide.

The normally solid polymer produced utilizing the catalysts of this invention can be subsequently converted into useful items such as fibers, film, molded articles, and the like, by means of conventional plastics fabrication equipment.

EXAMPLE I

In a dry flask equipped with a dropping funnel, condenser and stirrer was placed 60 grams (2.47 gram atoms) of 50 mesh magnesium powder. While maintaining a nitrogen atmosphere as the magnesium was gently stirred, 263.5 grams (2.47 moles) of dry n-pentyl chloride was slowly added through the dropping funnel at a rate sufficient to keep unreacting alkyl halide gently refluxing. Addition time was about 4 hours. At the conclusion of the reaction, 300 ml of dry n-hexane were added to the flask and the mixture heated to boiling while being stirred for 4 hours. Following this treatment, the flask was transferred to a dry box and the hexane was removed under reduced pressure leaving the magnesium reducing agent behind as a gray solid. Portions of the powdered magnesium reducing agent were individually slurried in one or more organoaluminum compounds to prepare each cocatalyst.

A one gallon (3.78 liter) stirred reactor, purged with dry nitrogen, was charged under an isobutane flush with cocatalyst, TiCl$_4$ and 2 liters of isobutane in that order. The reactor and its contents were then heated to 100° C., sufficient ethylene was charged to provide an ethylene partial pressure of 100 psig (689 kPa) and a polymerization time of 60 minutes was used. The polymer was recovered by flashing off diluent and ethylene.

The organoaluminum compound(s) used, amount of titanium compound used, the calculated atom ratios of Al/Mg and Al/Ti, and the amount of polyethylene made in terms of grams polymer per gram titanium are presented in Table I. Hydrogen was not used except for control runs 7 and 8. In these runs, 10 liters hydrogen (STP) was used per run.

Table I

| | Polymerization of Ethylene | | | |
|---|---|---|---|---|
| Run No. | Organo-aluminum Cpd. | Atom Ratios | | Titanium Total Milligram Atoms | Productivity g/g Ti |
| | | Al/Mg | Al/Ti | | |
| 1 | TEA[1] | 1.0 | 310 | 0.008 | 0 |
| 2 | TEA | 1.3 | 830 | 0.002 | 0 |
| 3 | EADC[2] | 1.3 | 830 | 0.002 | 70,000 |
| 4 | DEAC[3] | 1.4 | 830 | 0.002 | 3,300,000 |
| 5 | DEAC/TEA[4] | 1.4 | 830 | 0.002 | 240,000 |
| 6 | DEAC/EADC[4] | 1.4 | 830 | 0.002 | 170,000 |
| 7 | DEAC[5] | 0 | 131 | 0.003 | trace |
| 8 | TEA[5] | 0 | 84.4 | 0.003 | trace |

[1]Triethylaluminum.
[2]Ethylaluminum dichloride.
[3]Diethylaluminum chloride.
[4]Mole ratio of 1:1. Polymerization temperature was 104° C.
[5]No magnesium reducing agent in cocatalyst.

The results show in Runs 1 and 2 that a cocatalyst comprising a magnesium reducing agent in combination with triethylaluminum does not activate titanium tetrachloride and therefore an inactive ethylene polymerization catalyst results. Run 3 discloses that ethylaluminum dichloride/magnesium reducing agent has a relatively mild activating effect on TiCl$_4$. However, a very active ethylene polymerization system is obtained in invention Run 4 when TiCl$_4$ is activated with a magnesium reducing agent/dihydrocarbylaluminum halide cocatalyst.

Runs 5 and 6 show that a combination of diethylaluminum chloride (DEAC) and triethylaluminum or DEAC and ethylaluminum dichloride admixed with a magnesium reducing agent can be used to activate TiCl$_4$ and thereby obtain a fairly active ethylene polymerization catalyst system. However, there is no advantage in going this route in view of the results obtained in invention Run 4 where the advantage of using diethylaluminum chloride admixed with a magnesium reducing agent is demonstrated. Run 7 shows that the magnesium reducing agent is an essential part of the cocatalyst system since without its presence only a trace of polymer was made. Runs 8, 1 and 2 show that TEA is ineffective in this process whether magnesium reducing agent is absent or present.

EXAMPLE II

Several runs were made employing supported titanium tetrachloride in combination with ethyl benzoate as a catalyst adjuvant. The molar ratio of TiCl$_4$/ethyl benzoate in each run was 1:1. In Run 1 the weight ratio of titanium tetrachloride to a particulate silica support was 0.1 to 1. In Run 2, the weight ratio of titanium tetrachloride to support (a particulate anhydrous magnesium chloride) was 0.3 to 1. The TiCl$_4$ component in Run 2 consisted of 39.3 wt. % MgCl$_2$ support, 21.6 wt. % of a 1:1 molar ratio of TiCl$_4$ to ethyl benzoate complex and 39.1 wt. % durene, the durene acting as diluent and dispersant.

The cocatalyst system in each run consisted of diethylaluminum chloride and magnesium reducing agent as prepared in Example I. The charge order to the one gallon stirred reactor in each run was (1) the premixed cocatalyst slurry, (2) supported TiCl$_4$, and (3) 2 liters of isobutane. The reactor and contents in each run were heated to 220° F. (104° C.), ethylene was admitted to obtain a partial pressure of 100 psig and the run was continued for 60 minutes. At the conclusion, the polyethylene was recovered and weighed as described in Example I. From the weight of polymer, the productivity was calculated as grams polymer per gram titanium.

The amounts of titanium used, the calculated atom ratios of Al/Mg and Al/Ti and productivity results are presented in Table II.

Table II

| | Ethylene Polymerization on Supported Catalyst | | | |
|---|---|---|---|---|
| Run | Titanium | Atom Ratios | | Productivity |
| No. | Milligram atoms | Al/Mg | Al/Ti | g/g Ti |
| 1 | 0.005 | 1.4 | 96.8 | 1,000,000 |
| 2[1] | 0.004 | 1.4 | 224 | 850,000 |

[1]Combination mixed well. Durene added as a diluent.

The results show that catalyst system comprising titanium complexes with an adjuvant supported on either silica or magnesium chloride and a cocatalyst consisting of diethylaluminum chloride admixed with a magnesium reducing agent result in active, productive catalyst system useful in the polymerization of ethylene.

EXAMPLE III

A series of ethylene polymerization runs was made in which the quantity of titanium tetrachloride/magnesium reducing agent and/or the quantity of diethylaluminum chloride/magnesium reducing agent was varied somewhat so as to obtain various atom ratios of Al/Mg and Al/Ti. A polymerization temperature of either 80° C. or 100° C. was employed and no hydrogen was used. The charge order consisted of cocatalyst, TiCl$_4$ and isobutane diluent. After the one gallon stirred reactor and its contents were raised to the reaction temperature used, ethylene was admitted to obtain a partial pressure of 100 psig and the run was continued for 60 minutes. The polyethylene produced was recovered and weighed as before to determine the amount of polymer produced per gram titanium employed. The results are presented in Table III.

Table III

| | Ethylene Polymerization | | | |
|---|---|---|---|---|
| Run | Titanium | Reactor | Atom Ratio | Productivity |
| No. | Milligram atoms | Temp. °C. | Al/Mg | Al/Ti | g/g Ti |
| 1 | 0.01 | 80 | 1.4 | 29 | 386,000 |
| 2 | 0.002 | 80 | 1.4 | 216 | 700,000 |
| 3 | 0.001 | 80 | 1.3 | 2376 | 3,100,000 |
| 4 | 0.001 | 80 | 0.98 | 3260 | 3,100,000 |
| 5 | 0.002 | 100 | 1.4 | 876 | 2,400,000 |

Active catalyst systems were obtained at each reactor temperature employed. Atom ratios of Al/Mg ranging from 0.98:1 to 1.4:1 and atom ratios of Al/Ti ranging from 29:1 to 3260:1 were used. The most active systems are shown in Runs 2–5 which suggest that an important aspect of the invention is the Al/Ti atom ratios employed. As this ratio increases from about 200:1 to about 3,300:1 or more (at least up to about 2,400:1) the production of polyethylene per gram titanium employed increases from 700,000 g polymer per g Ti to 3,100,000 g polymer per g Ti.

EXAMPLE IV

Another series of ethylene polymerization runs was made, each in the presence of hydrogen. Various polymerization temperatures were used and various atom ratios of Al/Mg and Al/Ti were employed. Each polymer was recovered in the manner described in the preceding Examples and the melt index determined according to ASTM Procedure D 1238-65, Condition E and Condition F. Several other physical properties including density (ASTM D 1505-68), hardness, Shore D (ASTM D 2240-68), and flexural modulus (ASTM D 790-66) were determined for three of the polymers. Before evaluation of physical properties each polymer was admixed with 0.05 parts by weight per 100 parts by weight polymer each of the antioxidants 2,6-di-t-butyl-4-methylphenol; dilaurylthiodipropionate; and 4,4'-thiobis-(6-t-butyl-m-cresol).

The conditions employed and results obtained are given in Table IV.

Table IV

| | | | | | Ethylene Polymerization | | | | | | | |
|---|---|---|---|---|---|---|---|---|---|---|---|---|
| Run | Titanium Milligram | Polymerization | Atom Ratios | | Hydrogen STP | Productivity | Melt | HLMI[1] | Density | Flexural Modulus | | Hardness Shore |
| No. | atoms | Temp. °C. | Al/Mg | Al/Ti | (Liters) | g/g Ti | Index | MI | g/cc | psi | MPa | D |
| 1 | 0.004 | 60 | 1.0 | 620 | 16 | 2,400,000 | 3.2[2] | nd[3] | nd | nd | nd | nd |
| 2 | .004 | 60 | 1.6 | 660 | 48 | 900,000 | 1.1 | 40 | nd | nd | nd | nd |

Table IV-continued

| | | | | | Ethylene Polymerization | | | | | | | |
|---|---|---|---|---|---|---|---|---|---|---|---|---|
| Run No. | Titanium Milligram atoms | Polymerization Temp. °C. | Atom Ratios Al/Mg | Atom Ratios Al/Ti | Hydrogen STP (Liters) | Productivity g/g Ti | Melt Index | HLMI[1] MI | Density g/cc | Flexural Modulus psi | Flexural Modulus MPa | Hardness Shore D |
| 3 | .004 | 60 | 1.6 | 660 | 48 | 820,000 | 1.5 | 34 | nd | nd | | nd |
| 4 | .004 | 60 | 1.6 | 660 | 64 | 650,000 | 4.8 | 43 | nd | nd | | nd |
| 5 | .008 | 80 | 1.4 | 215 | 5 | 450,000 | 0.2 | 38 | 0.9571 | 211,000 | 1455 | 69 |
| 6 | .008 | 80 | 1.4 | 215 | 32 | 560,000 | 1.4 | 34 | nd | nd | | nd |
| 7 | .008 | 80 | 1.4 | 215 | 24 | 360,000 | 2.7 | 31 | nd | nd | | nd |
| 8 | .008 | 80 | 1.4 | 215 | 6 | 460,000 | 3.9 | 33 | nd | nd | | nd |
| 9 | .008 | 80 | 1.4 | 215 | 32 | 1,300,000 | 6.4 | 29 | nd | nd | | nd |
| 10 | .008 | 80 | 1.0 | 215 | 48 | 730,000 | 7.9 | 29 | nd | nd | | nd |
| 11 | .008 | 80 | 1.0 | 310 | 57 | 750,000 | 10.1 | 34 | nd | nd | | nd |
| 12 | .008 | 100 | 1.4 | 215 | 21 | 600,000 | 1.3 | 27 | 0.9620 | 243,000 | 1675 | 70 |
| 13 | .004 | 100 | 1.7 | 660 | 12 | 2,500,000 | 2.0 | 27 | nd | nd | | nd |
| 14 | .002 | 100 | 1.7 | 1320 | 19 | 4,500,000 | 10.0 | 26 | nd | nd | | nd |
| 15 | .008 | 100 | 1.4 | 215 | 24 | 580,000 | 17.7 | 26 | 0.9706 | 270,000 | 1862 | 68 |
| 16 | .004 | 100 | 1.7 | 660 | 32 | 1,500,000 | 94. | nd | nd | nd | | nd |
| 17 | .004 | 100 | 1.7 | 660 | 48 | 930,000 | 420. | nd | nd | nd | | nd |

[1]Ratio of ASTM D 1238-65, Condition F, melt index (high load melt index) to ASTM D 1238-65, Condition E, melt index which is interpreted as a measure of the molecular weight distribution of the polymer. The larger the number the broader the distribution. These ratios indicate a fairly narrow molecular weight distribution for the polymers.
[2]High load melt index
[3]nd is not determined Inspection of the results with respect to the melt indices obtained reveals that a wide range of melt flows can be made with the catalyst systems of this invention by regulation of the conditions employed. Thus melt flows ranging from a high load melt index of 3.2, Run 1, to a regular melt index of 420, Run 17, were obtained. The density values determined ranged from 0.9571 g/cc (Run 5) for a polymer having a melt index of 0.2, a flexural modulus of 211,000 psi and a Shore D hardness of 69 to 0.9706 g/cc (Run 15) for a polymer having a melt index of about 18, a flexural modulus of 270,000 and a Shore D hardness of 68. These property values indicate that the polymers obtained are typical of those reported in the literature as having generally linear structures and are representative of polymers produced by means of organometaltitanium trichloride catalysts. Those skilled in the art will recognize that polymers made with the catalyst systems of this invention can be used in a wide variety of fabrication techniques including blow molding, extrusion, coating, injection molding, thermoforming, and the like by proper selection of melt flows, etc.

The other data presented reveal that melt index and HLMI/MI are independent variables which are controllable. Melt index can be controlled, as is well known, by regulating the amount of hydrogen present in the reactor during polymerization and by increasing polymerization temperature. This is illustrated in Runs 2–4 and 16–17 in which similar atom ratios of Al/Mg and Al/Ti are used. The HLMI/MI ratio can be adjusted somewhat by regulating polymerization temperature. As the temperature increases the HLMI/MI ratio decreases. Runs 1–4, 5–11 and 12–17 illustrate this behavior.

EXAMPLE V

This example demonstrates the necessity for premixing the magnesium reducing agent and the dihydrocarbylaluminum halide prior to contact with the titanium tetrahalide.

The magnesium reducing agent was prepared as in Example I. The dihydrocarbylaluminum halide was diethylaluminum chloride. The polymerizations were carried out essentially as in Example I except the order of addition was as noted hereinbelow in Table V.

Table V

| Run | Order of Addition | Productivity g/g |
|---|---|---|
| 1 (Invention) | Mg Reducing Agent/DEAC mixture then TiCl$_4$ | 850,000 |
| 2 (control) | DEAC then TiCl$_4$/Mg Reducing Agent Mixture | 25,000 |

These data show that contacting the titanium tetrachloride with one of the components of the cocatalyst prior to the time the components are mixed gives drastically poorer results in ethylene polymerization. In both the invention run and the control, there was present ethyl benzoate as an adjuvant with the TiCl$_4$. Also, in both runs TiCl$_4$ was carried on a silica support.

While this invention has been described in detail for the purpose of illustration, it is not to be construed as limited thereby but is intended to cover all changes and modifications within the spirit and scope thereof.

We claim:

1. A process comprising:
   reacting an organic halide having the formula RX or R'X$_2$ wherein X represents a halogen atom, R is selected from alkynyl, alkenyl, alkyl, aryl, cycloalkenyl, and cycloalkyl radicals and combinations thereof containing from 1 to 12 carbon atoms per molecule and R' is a saturated divalent hydrocarbyl radical containing from 2 to 10 carbon atoms per molecule and magnesium metal in the absence of a complexing diluent to form a magnesium reducing agent reaction mixture containing at least 10 weight percent each of a diorganomagnesium compound and magnesium halide;
   mixing the total magnesium reducing agent reaction mixture thus produced with a dihydrocarbylaluminum halide of the formula R"$_2$AlX wherein R" is an alkyl or an aryl radical having 1 to 12 carbon atoms and X is a halogen atom to form a cocatalyst; and thereafter
   contacting said cocatalyst with a titanium tetrahalide.

2. A method according to claim 1 wherein said organic halide is added slowly to said magnesium metal in the absence of any extraneous diluent.

3. A method according to claim 1 wherein said titanium tetrahalide is titanium tetrachloride.

4. A method according to claim 1 wherein there is added in addition a polar organic compound which is an electron donor.

5. A method according to claim 4 wherein said polar organic compound is ethyl benzoate and is added to said titanium tetrahalide prior to contact with said cocatalyst.

6. A method according to claim 1 wherein said organic halide is added dropwise to said magnesium metal.

7. A method according to claim 6 wherein said organic halide has the formula RX wherein R is an alkynyl, alkenyl, alkyl, aryl, cycloalkenyl, or cycloalkyl radical having 1 to 12 carbon atoms and X is chlorine or bromine.

8. A method according to claim 7 wherein the atom ratio of aluminum to titanium is within the range of 200:1 to 3300:1.

9. A method according to claim 8 wherein the atom ratio of aluminum to magnesium is within the range of 0.1:1 to 2:1 and wherein said organic halide is added to said magnesium metal in an about stoichiometric amount.

10. A method according to claim 9 wherein said dihydrocarbylaluminum halide is diethylaluminum chloride.

11. A method according to claim 10 wherein said organic halide is n-pentyl chloride and the temperature during said addition of said organic halide is the reflux temperature of said organic halide, said organic halide being added dropwise to said magnesium.

12. A catalyst produced by the method of claim 11.

13. A catalyst produced by the method of claim 1.

14. A polymerization process comprising contacting at least one mono-1-olefin under polymerization conditions with the catalyst of claim 1.

15. A method according to claim 14 wherein said polymerization is carried out in the presence of a diluent under conditions of temperature and pressure such that said diluent is in the liquid phase and the resulting polymer is insoluble in said diluent, said catalyst being used without the subsequent addition of an organoaluminum compound activator.

* * * * *